US012669706B2

(12) United States Patent
Peng et al.

(10) Patent No.: US 12,669,706 B2
(45) Date of Patent: Jun. 30, 2026

(54) HEAD-UP DISPLAY DEVICE

(71) Applicant: Coretronic Corporation, Hsin-Chu (TW)

(72) Inventors: Kuei-En Peng, Hsin-Chu (TW); Po-Che Lee, Hsin-Chu (TW); Tao-Hung Kuo, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 934 days.

(21) Appl. No.: 17/725,552

(22) Filed: Apr. 21, 2022

(65) Prior Publication Data

US 2022/0373798 A1 Nov. 24, 2022

Related U.S. Application Data

(60) Provisional application No. 63/191,337, filed on May 21, 2021.

(30) Foreign Application Priority Data

Jul. 13, 2021 (CN) .......................... 202110788125.5

(51) Int. Cl.
*G02B 27/01* (2006.01)
*B60K 35/10* (2024.01)
(Continued)

(52) U.S. Cl.
CPC .......... *G02B 27/0149* (2013.01); *B60K 35/10* (2024.01); *B60K 35/235* (2024.01);
(Continued)

(58) Field of Classification Search
CPC .... B60K 35/00; B60K 35/23; B60K 2360/23; B60K 2360/25; B60K 2360/336;
(Continued)

(56) References Cited

U.S. PATENT DOCUMENTS

| | | | |
|---|---|---|---|
| 10,423,053 B2 | 9/2019 | Lee | |
| 10,606,075 B2 | 3/2020 | Choi et al. | |
| | (Continued) | | |

FOREIGN PATENT DOCUMENTS

| | | |
|---|---|---|
| CN | 108761789 | 11/2018 |
| CN | 106471417 | 3/2019 |
| | (Continued) | |

OTHER PUBLICATIONS

"Office Action of Korea Counterpart Application", issued on Jun. 24, 2024, p. 1-p. 9.
(Continued)

*Primary Examiner* — Stephone B Allen
*Assistant Examiner* — Daniel J. Jordan
(74) *Attorney, Agent, or Firm* — JCIPRNET

(57) ABSTRACT

A head-up display device including a display unit, a polarization beam-splitting module, and an optical module is provided. The polarization beam-splitting module receives a first image beam and a second image beam from the display unit, and transmits the first image beam and the second image beam to the optical module. The first image beam and the second image beam are respectively reflected by the optical module to an outside of the head-up display device, and then transmitted to a target element, to form a first virtual image and a second virtual image. By the polarization beam-splitting module, an optical path length of the first image beam from the display unit to a position of the first virtual image formed by itself is longer than an optical path length of the second image beam from the display unit to a position of the second virtual image formed by itself.

15 Claims, 5 Drawing Sheets

(51) Int. Cl.
  *B60K 35/235* (2024.01)
  *G02B 5/30* (2006.01)
  *G02B 27/28* (2006.01)

(52) U.S. Cl.
  CPC ....... *G02B 5/3083* (2013.01); *G02B 27/0101*
    (2013.01); *G02B 27/0179* (2013.01); *G02B*
    *27/283* (2013.01); *G02B 2027/015* (2013.01);
    *G02B 2027/0187* (2013.01)

(58) Field of Classification Search
  CPC .............. G02B 5/3083; G02B 27/0149; G02B
    27/0093; G02B 27/0101; G02B 27/0179;
    G02B 27/283; G02B 2027/015; G02B
    2027/0187; G02B 2027/0127; G02B
    2027/0152
  USPC ............. 359/13, 28, 485.07, 489.01, 489.06,
    359/494.01, 609, 630, 843
  See application file for complete search history.

(56) References Cited

U.S. PATENT DOCUMENTS

| | | | |
|---|---|---|---|
| 2009/0303158 A1 | 12/2009 | Takahashi et al. | |
| 2011/0164221 A1 | 7/2011 | Tilleman et al. | |
| 2017/0038583 A1 | 2/2017 | Kim et al. | |
| 2017/0146803 A1 | 5/2017 | Kishigami et al. | |
| 2019/0049725 A1 | 2/2019 | Kondo et al. | |
| 2020/0012099 A1 | 1/2020 | Kim et al. | |
| 2020/0018977 A1 | 1/2020 | Qin et al. | |
| 2020/0150433 A1* | 5/2020 | Satoh ................. | G02B 27/0101 |
| 2020/0201036 A1 | 6/2020 | Hong | |
| 2020/0209618 A1 | 7/2020 | Lee | |
| 2021/0382304 A1* | 12/2021 | You .......................... | G02B 3/00 |

FOREIGN PATENT DOCUMENTS

| | | |
|---|---|---|
| CN | 109407315 | 3/2019 |
| CN | 109581667 | 4/2019 |
| CN | 109643016 | 4/2019 |
| CN | 111487786 | 8/2020 |
| JP | 2002303822 | 10/2002 |
| JP | 2011175126 | 9/2011 |
| JP | 2021508068 | 2/2021 |
| KR | 20180063688 | 6/2018 |
| TW | 533028 | 5/2016 |
| TW | M554174 | 1/2018 |
| TW | 201831948 | 9/2018 |
| WO | 2015190157 | 12/2015 |
| WO | 2018199244 | 11/2018 |
| WO | 2020186498 | 9/2020 |

OTHER PUBLICATIONS

Zong Qin et al., "Dual-focal-plane augmented reality head-up display using a single picture generation unit and a single freeform mirror," Applied Optics, Jul. 2019, pp. 1-10.
"Search Report of Europe Counterpart Application", issued on Jan. 26, 2023, p. 1-p. 13.
"Office Action of China Counterpart Application", issued on Aug. 21, 2025, p. 1-p. 7.
"Office Action of Japan Counterpart Application", issued on Jul. 1, 2025, p. 1-p. 6.

* cited by examiner

HEAD-UP DISPLAY DEVICE

CROSS-REFERENCE TO RELATED APPLICATION

This application claims the priority benefit of U.S. provisional application Ser. No. 63/191,337, filed on May 21, 2021 and China application serial no. 202110788125.5, filed on Jul. 13, 2021. The entirety of each of the above-mentioned patent applications is hereby incorporated by reference herein and made a part of this specification.

BACKGROUND

Technical Field

The disclosure relates to a display device, and more particularly, to a head-up display device.

Description of Related Art

An augmented reality head-up display device for a vehicle is generally designed to display images of two different contents. The content shown in one image may present fixed driving information, such as the vehicle speed, fuel level, mileage, and speed limit. The content shown in the other image presents driving information that relates to the road conditions, such as left and right turn signs, landmark information, and warning signs. The image that shows the fixed driving information is expected to be displayed at a closer depth from a driver, such as 2 meters, while the image that shows the driving information relating to the road conditions is displayed at a farther depth from the driver, such as 8 meters.

In the current architecture of the augmented reality head-up display device, two picture generation units (PGU) placed in different positions are usually used to respectively generate two images with different image distances. However, due to the disposition of the two image generation units, the overall architecture has disadvantages such as larger volume, heavier arrangement, higher power consumption, and higher cost.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The disclosure provides a head-up display device, which may reduce a system volume, reduce power consumption, and further reduce the cost.

An embodiment of the disclosure provides a head-up display device, which is configured to project a first image beam and a second image beam onto a target element. The head-up display device includes a display unit, a polarization beam-splitting module, and an optical module. The display unit is configured to provide the first image beam having a first polarization direction and the second image beam having a second polarization direction. The polarization beam-splitting module receives the first image beam and the second image beam from the display unit, and transmits the first image beam and the second image beam to the optical module. The polarization beam-splitting module includes a polarization beam-splitting layer, a first reflection unit, and a second reflection unit. The polarization beam-splitting layer is configured to guide the second image beam to leave the polarization beam-splitting module, and guide the first image beam to the first reflection unit and the second reflection unit. The first reflection unit and the second reflection unit are not located on a transmission of the second image beam. The optical module includes a free-form mirror. The free-form mirror is configured to receive the first image beam and the second image beam from the polarization beam-splitting module. The first image beam and the second image beam are respectively reflected by the optical module to an outside of the head-up display device, and then transmitted to the target element, so as to form a first virtual image and a second virtual image. By the polarization beam-splitting module, an optical path length of the first image beam from the display unit to a position of the first virtual image formed by the first image beam is longer than an optical path length of the second image beam from the display unit to a position of the second virtual image formed by the second image beam.

Based on the above, in an embodiment of the disclosure, the head-up display device is designed to enable a single display unit to generate the first image beam and the second image beam. Therefore, the architecture of the overall head-up display device has advantages such as smaller volume, lower power consumption, and lower cost.

Other objectives, features and advantages of the invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DETAILED DESCRIPTION OF DISCLOSED EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1A:
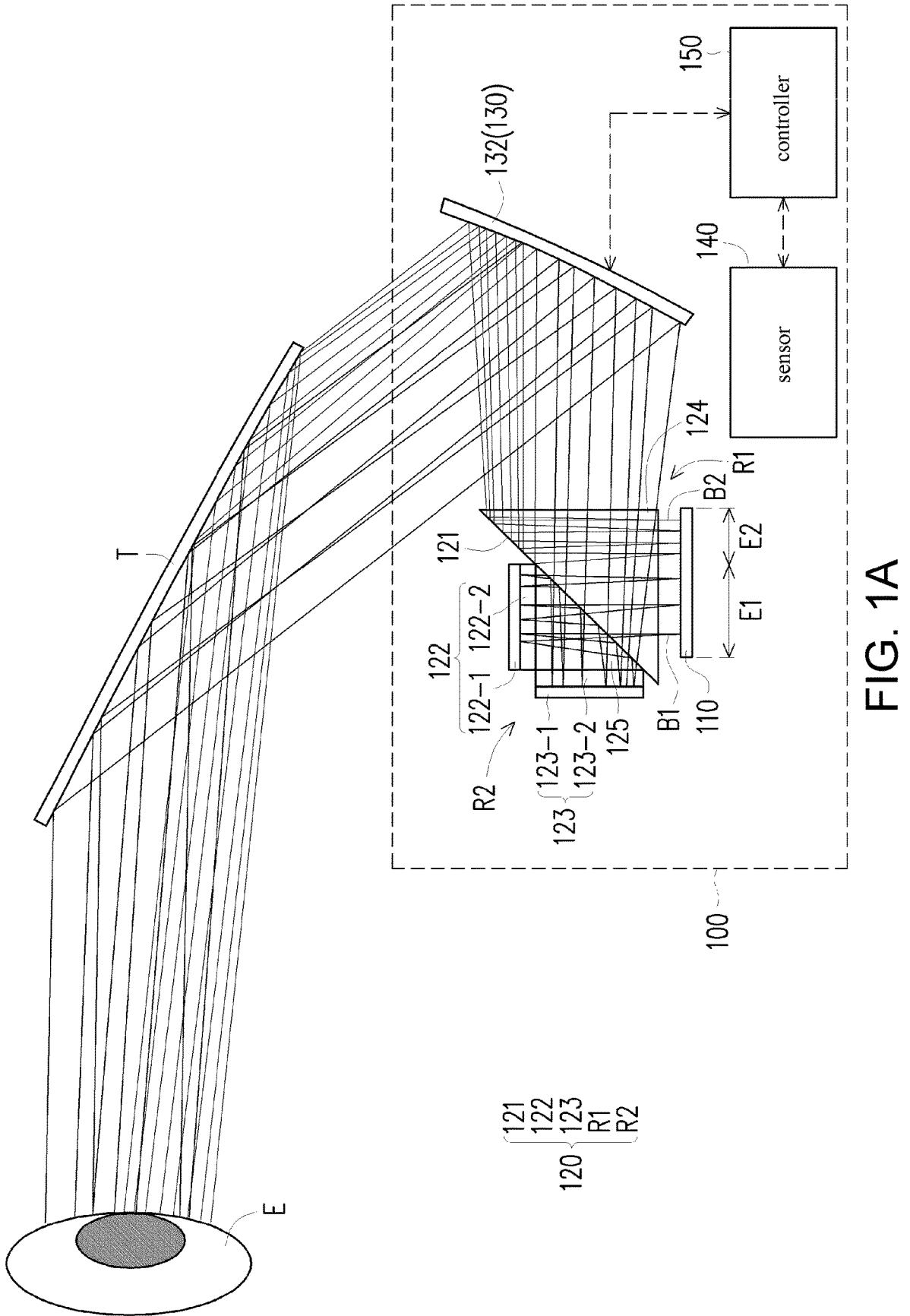
FIG. 1A is a schematic view of a head-up display device according to the first embodiment of the disclosure.
Figure 1B:
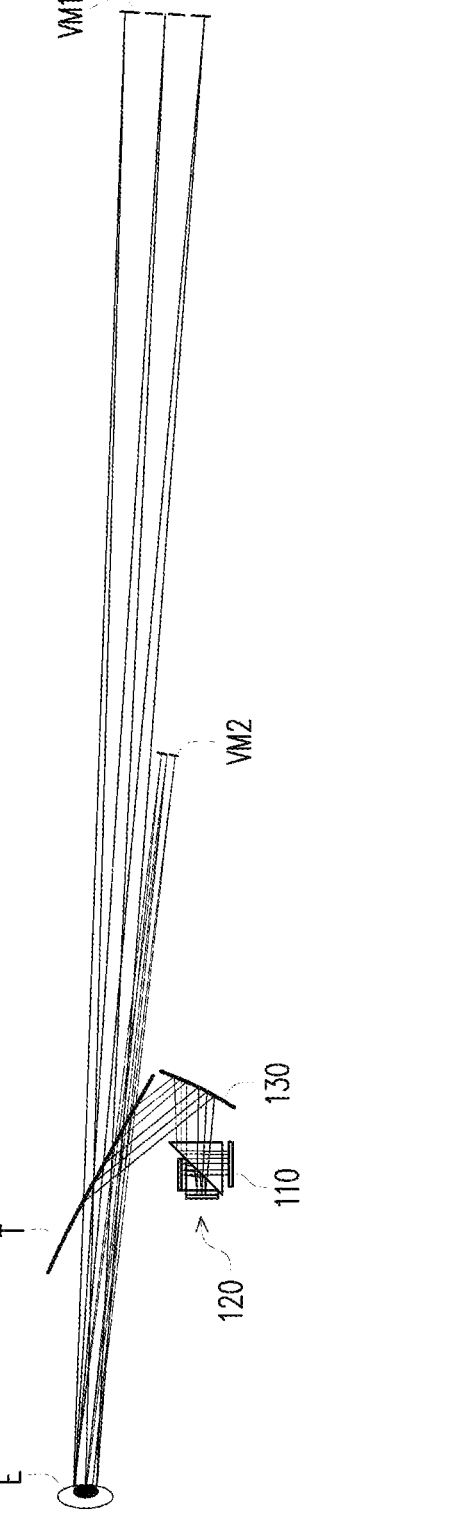
FIG. 1B is a schematic view of two virtual images formed by the head-up display device according to the first embodiment of the disclosure.

FIG. 1A is a schematic view of a head-up display device according to the first embodiment of the disclosure. FIG. 1B is a schematic view of two virtual images formed by the head-up display device according to the first embodiment of the disclosure. Referring to FIGS. 1A and 1B, an embodiment of the disclosure provides a head-up display device 100, which is configured to project a first image beam B1 and a second image beam B2 onto a target element T. The head-up display device 100 is, for example, installed on a vehicle, such as a car. The target element T is, for example, a windshield of the car. The first image beam B1 and the second image beam B2 are reflected by the target element T to an eye E of a viewer (for example, a driver of the vehicle), so that the viewer may see a first virtual image VM1 and a second virtual image VM2 that are formed at different image distances and show different driving information in front of the target element T.

In this embodiment, the head-up display device 100 includes a display unit 110, a polarization beam-splitting module 120, and an optical module 130. The display unit 110 is configured to provide the first image beam B1 having a first polarization direction and the second image beam B2 having a second polarization direction. The first polarization direction and the second polarization direction are perpendicular to each other. For example, the first polarization direction may be P polarization, and the second polarization direction may be S polarization. Alternatively, the first polarization direction may be S polarization, and the second polarization direction may be P polarization. However, the disclosure is not limited thereto.

In detail, in this embodiment, the display unit 110 has a first effective imaging area E1 and a second effective imaging area E2 disposed adjacently. In the embodiment, the display unit 110 may be a picture generation unit (PGU), which includes, for example, a transmissive liquid crystal panels or other light beam modulators. And in the embodiment the first effective imaging area E1 and the second effective imaging area E2 are arranged on the same plane of the display unit 110. The first effective imaging area E1 and the second effective imaging area E2 are configured to respectively generate the first image beam B1 and the second image beam B2, and the first virtual image VM1 and the second virtual image VM2 formed outside the head-up display device 100 present different image contents. The polarization beam-splitting module 120 receives the first image beam B1 and the second image beam B2 from the display unit 110, and transmits the first image beam B1 and the second image beam B2 to the optical module 130. In this embodiment, the first effective imaging area E1 and the second effective imaging area E2 of the display unit 110 are, for example, respectively configured with a polarization selective film (not shown). The polarization selective film is disposed at a light exiting surface of the first effective imaging area E1, and the first image beam B1 passes through the polarization selective film to forms the beam having the first polarization direction. The polarization selective film is disposed at a light exiting surface of the second effective imaging area E2, and the second image beam B2 passes through the polarization selective film to form the beam having the second polarization direction.

In this embodiment, the polarization beam-splitting module 120 includes a first region R1 and a second region R2. The first region R1 is configured to enable the first image beam B1 and the second image beam B2 from the display unit 110 to be incident, and enable the first image beam B1 and the second image beam B2 to be exited. The second region R2 is located adjacent to the first region R1, and is configured to enable the first image beam B1 to be incident and reflected multiple times before being exited to the first region R1.

In this embodiment, the polarization beam-splitting module 120 further includes a polarization beam-splitting layer 121, a first reflection unit 122, and a second reflection unit 123. The polarization beam-splitting layer 121 is disposed between the first region R1 and the second region R2, and is configured to enable the first image beam B1 having the first polarization direction to pass through and reflect the second image beam B2 having the second polarization direction. That is, the polarization beam-splitting layer 121 is configured to guide the second image beam B2 to leave the polarization beam-splitting module 120, and guide the first image beam B1 to the first reflection unit 122 and the second reflection unit 123. The polarization beam-splitting layer 121, for example, enables a P-polarized beam to pass through and reflects an S-polarized beam, or enables the S-polarized beam to pass through and reflects the P-polarized beam. However, the disclosure is not limited thereto.

In this embodiment, the first reflection unit 122 includes a first mirror 122-1 and a first quarter-wave plate 122-2. The second reflection unit 123 includes a second mirror 123-1 and a second quarter-wave plate 123-2. The first reflection unit 122 and the second reflection unit 123 are disposed beside the second region R2. The first quarter-wave plate 122-2 is disposed between the first mirror 122-1 and the polarization beam-splitting layer 121. The second quarter-wave plate 123-2 is disposed between the second mirror 123-1 and the polarization beam-splitting layer 121. The first mirror 122-1 and the second mirror 123-1 are arranged to be perpendicular to each other. The second region R2 is defined between the first reflection unit 122, the second reflection unit 123, and the polarization beam-splitting layer 121.

In this embodiment, the first image beam B1 having the first polarization direction from the first effective imaging area E1 of the display unit 110 sequentially passes through the first region R1 and the polarization beam-splitting layer 121, and then enters the second region R2. The first image beam B1 then passes through the first region R1 to be transmitted to the optical module 130 after sequentially passing through the first quarter-wave plate 122-2, being reflected by the first mirror 122-1, passing through the first quarter-wave plate 122-2, being reflected by the polarization beam-splitting layer 121, passing through the second quarter-wave plate 123-2, being reflected by the second mirror 123-1, passing through the second quarter-wave plate 123-2, and being reflected by the polarization beam-splitting layer 121. The first image beam B1 having the first polarization direction sequentially passes through the first quarter-wave plate 122-2, is reflected by the first mirror 122-1, and passes through the first quarter-wave plate 122-2. The first polarization direction of the first image beam B1 is converted into the second polarization direction after the first image beam B1 passes through the first quarter-wave plate 122-2 twice, and thus the first image beam B1 having the second polarization direction is reflected by the polarization beam-splitting layer 121. Then, the first image beam B1 having the second polarization direction sequentially passes through the second quarter-wave plate 123-2, is reflected by the second mirror 123-1, and passes through the second quarter-wave plate 123-2. The second polarization direction of the first image beam B1 is converted into the first polarization direction after the first image beam B1 passes through the second quarter-wave plate 123-2 twice, and then the first image beam B1 having first polarization direction passes through the polarization beam-splitting layer 121. After the second image beam B2 having the second polarization direction from the second effective area E2 of the display unit 110 enters the first region R1, the second image beam B2 having the second polarization direction from the display unit 110 is reflected by the polarization beam-splitting layer 121 and is transmitted to the optical module 130. In other words, the first reflection unit 122 and the second reflection unit 123 are not located on a transmission path of the second image beam B2.

In this embodiment, a range of an orthographic projection of the first mirror 122-1 on the display unit 110 and the second effective imaging area E2 of the display unit 110 do not overlap with each other.

In this embodiment, the polarization beam-splitting module 120 includes a first transparent body 124 disposed in the first region R1 and a second transparent body 125 disposed in the second region R2. The polarization beam-splitting layer 121 is disposed between the first transparent body 124 and the second transparent body 125. A material of the transparent body is, for example, glass. The polarization beam-splitting layer 121 is, for example, disposed on a surface of the second transparent body 125 facing the first transparent body 124, and a contact area between the first transparent body 124 and the polarization beam-splitting layer 121 is less than a total area of the polarization beam-splitting layer 121.

In this embodiment, the optical module 130 includes a free-form mirror 132. The free-form mirror 132 is configured to receive the first image beam B1 and the second image beam B2 from the polarization beam-splitting module 120. The first image beam B1 and the second image beam B2 are respectively reflected by the optical module 130 to an outside of the head-up display device 100, and then is transmitted to the target element T, so as to form the first virtual image VM1 and the second virtual image VM2. By the arrangement of the polarization beam-splitting module 120, an optical path length of the first image beam B1 from the display unit 110 to a position of the first virtual image VM1 formed by the first image beam B1 is longer than an optical path length of the second image beam B2 from the display unit 110 to a position of the second virtual image VM2 formed by the second image beam B2.

In this embodiment, the head-up display device 100 further includes a sensor 140 and a controller 150. The sensor 140 is configured to sense a position of the eye E and generate a sensing signal. The controller 150 includes, for example, a microcontroller unit (MCU), a central processing unit (CPU), a microprocessor, a digital signal processor (DSP), a programmable controller, a programmable logic device (PLD), other similar devices, or a combination of the devices. The disclosure is not limited thereto. In addition, in an embodiment, each of functions of the controller 150 may be achieved as multiple program codes. The program codes are stored in a memory, and executed by the controller 150. Alternatively, in an embodiment, each of the functions of the controller 150 may be achieved as one or more circuits. The disclosure does not limit the use of software or hardware to achieve the functions of the controller 150.

In this embodiment, the controller 150 is electrically connected to the sensor 140, and coupled to the optical module 130. The optical module 130 includes a driver (not shown) electrically connected to the free-form mirror 132 to drive the deflection of the free-form mirror 132. The controller 150 receives the sensing signal from the sensor 140, and controls the driver to adjust a deflection angle of the free-form mirror 132 corresponding to a change of the position of the eye E of the user (the driver), so that the first virtual image VM1 and the second virtual image VM2 are clearly presented.

Based on the above, in an embodiment of the disclosure, the head-up display device 100 is designed to enable the display unit 110 to generate the first image beam B1 having the first polarization direction and the second image beam B2 having the second polarization direction at the same time. The head-up display device 100 is designed as follows. The first image beam B1 is reflected three times by the polarization beam-splitting module 120, and the second image beam B2 is reflected once by the polarization beam-splitting module 120, so that the optical path length of the first image beam B1 from the display unit 110 to the position of the first virtual image VM1 is longer than the optical path length of the second image beam B2 from the display unit 110 to the position of the second virtual image VM2. Therefore, an architecture of the overall head-up display device 100 has advantages such as smaller volume, lower power consumption, and lower cost.

Figure 2:
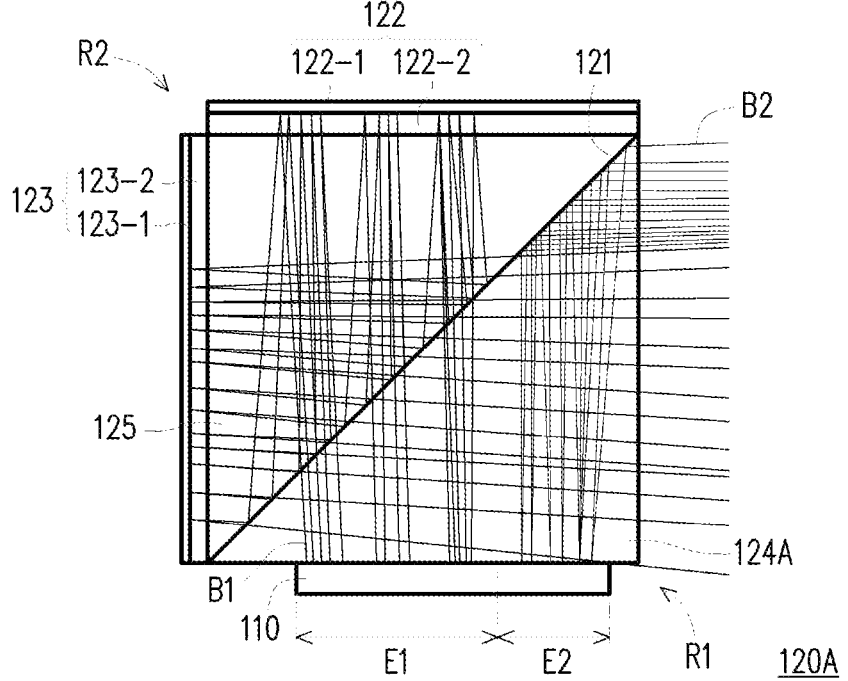
FIG. 2 is a schematic view of a polarization beam-splitting module in a head-up display device according to the second embodiment of the disclosure.

FIG. 2 is a schematic view of a polarization beam-splitting module in a head-up display device according to the second embodiment of the disclosure. Referring to FIG. 2, a polarization beam-splitting module 120A of FIG. 2 is similar to the polarization beam-splitting module 120 of FIG. 1A, and the main difference is as follows. In this embodiment, the range of the orthographic projection of the first mirror 122-1 on the display unit 110 and the second effective imaging area E2 of the display unit 110 overlap with each other.

In this embodiment, the polarization beam-splitting module 120A includes a first transparent body 124A disposed in the first region R1 and a second transparent body 125 disposed in the second region R2. The polarization beam-splitting layer 121 is disposed on the surface of the second transparent body 125 facing the first transparent body 124A or a surface of the first transparent body 124A facing the second transparent body 125, and is located between the first transparent body 124A and the second transparent body 125. A contact area between the first transparent body 124A and the polarization beam-splitting layer 121 is equal to the total area of the polarization beam-splitting layer 121. Advantages of the head-up display device in the second embodiment of the disclosure are similar to those of the head-up display device 100 of FIG. 1A. Thus, details in this regard will not be further reiterated in the following.

Figure 3A:
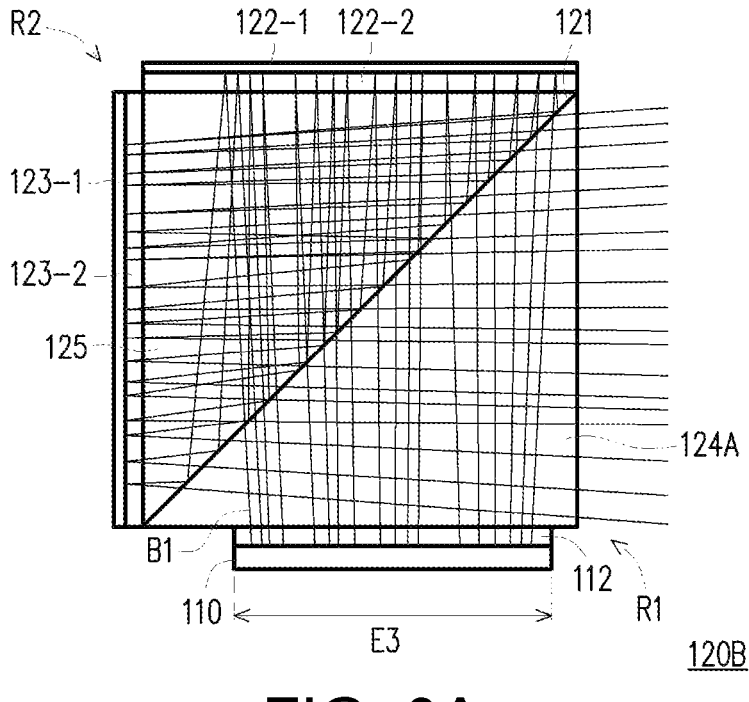
FIG. 3A is a schematic view of an optical path of a first image beam in a polarization beam-splitting module of a head-up display device at a first time interval according to the third embodiment of the disclosure.
Figure 3B:
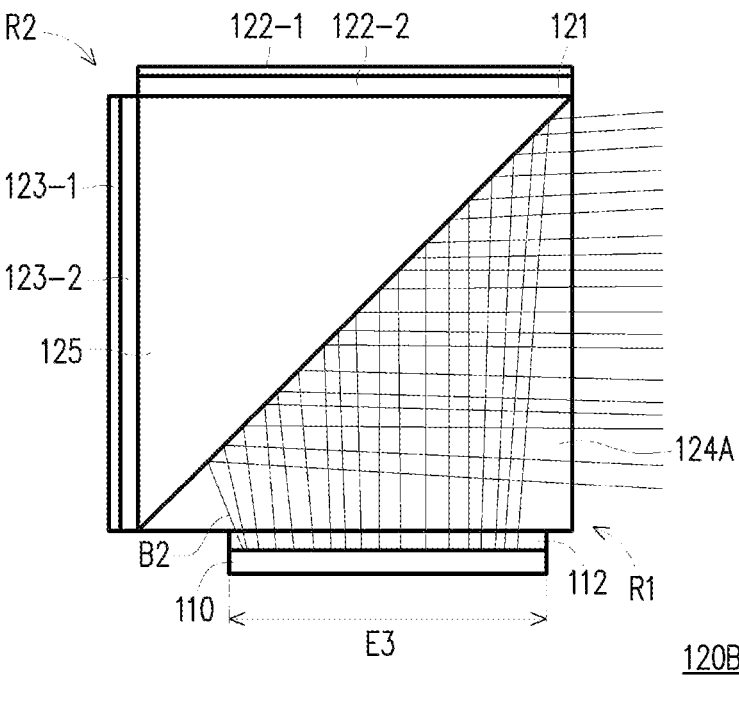
FIG. 3B is a schematic view of the optical path of a second image beam in the polarization beam-splitting module of the head-up display device at a second time interval according to the third embodiment of the disclosure.

FIG. 3A is a schematic view of an optical path of a first image beam in a polarization beam-splitting module of a head-up display device at a first time interval according to the third embodiment of the disclosure. FIG. 3B is a schematic view of the optical path of a second image beam of the polarization beam-splitting module in the head-up display device at a second time interval according to the third embodiment of the disclosure. Referring to FIGS. 3A and 3B, a polarization beam-splitting module 120B of FIG. 3A or 3B is similar to the polarization beam-splitting module 120 of FIG. 1A, and a relative position of a virtual image formed by the polarization beam-splitting module 120B of FIG. 3A or FIG. 3B is also similar to that of FIG. 1B. The main difference is as follows. In this embodiment, the display unit 110 includes an effective imaging area E3. The effective imaging area E3 is configured to generate the first image beam B1 and the second image beam B2 at different time intervals, and the first virtual image VM1 and the second virtual image VM2 formed outside the head-up display device present different image contents (as shown in FIG. 1B).

In this embodiment, the head-up display device further includes a polarization switching device 112. The polarization switching device 112 is disposed between the display unit 110 and the polarization beam-splitting module 120B to change the polarization direction of the image beam passing therethrough in different time intervals. The polarization switching device 112 is, for example, a polarization rotator such as a liquid crystal panel. At the first time interval, the first image beam B1 emitted from the effective imaging area E3 of the display unit 110 passes through the polarization switching device 112 to have the first polarization direction. At the second time interval, the second image beam B2 emitted from the effective imaging area E3 of the display unit 110 passes through the polarization switching device 112 to have the second polarization direction.

In this embodiment, the polarization beam-splitting module 120B includes the first transparent body 124A disposed in the first region R1 and the second transparent body 125 disposed in the second region R2. The polarization beam-splitting layer 121 is disposed between the second transparent body 125 and the first transparent body 124A, and the contact area between the first transparent body 124A and the polarization beam-splitting layer 121 is equal to the total area of the polarization beam-splitting layer 121. Advantages of the head-up display device in the third embodiment of the disclosure are similar to those of the head-up display device 100 of FIG. 1A. Thus, details in this regard will not be further reiterated in the following.

Figure 4A:
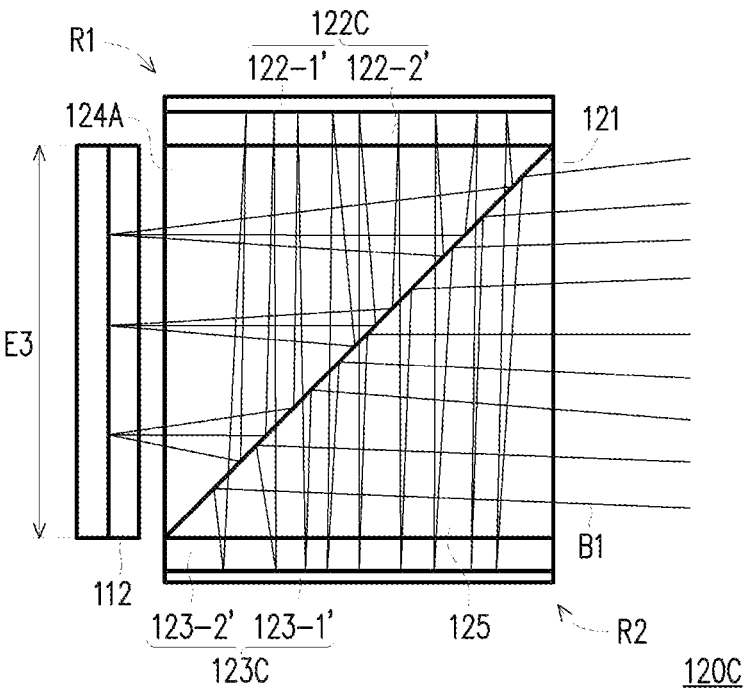
FIG. 4A is a schematic view of an optical path of a first image beam in a polarization beam-splitting module of a head-up display device at a first time interval according to the fourth embodiment of the disclosure.
Figure 4B:
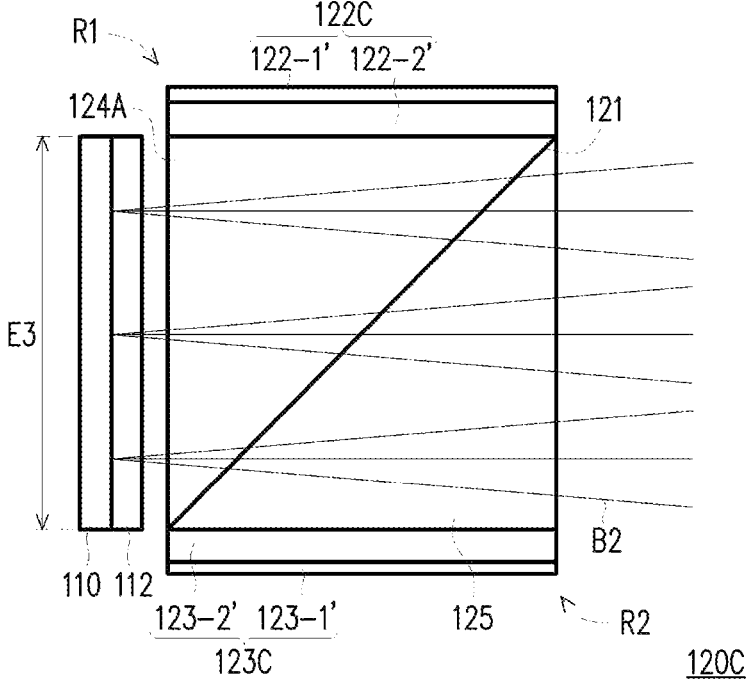
FIG. 4B is a schematic view of the optical path of a second image beam in the polarization beam-splitting module of the head-up display device at a second time interval according to the fourth embodiment of the disclosure.

FIG. 4A is a schematic view of an optical path of a first image beam in a polarization beam-splitting module of a head-up display device at a first time interval according to the fourth embodiment of the disclosure. FIG. 4B is a schematic view of the optical path of a second image beam in the polarization beam-splitting module of the head-up display device at a second time interval according to the fourth embodiment of the disclosure. Referring to FIGS. 4A and 4B, a polarization beam-splitting module 120C of FIG. 4A or 4B is similar to the polarization beam-splitting module 120 of FIG. 1A, and a relative position of a virtual image formed by the polarization beam-splitting module 120C of FIG. 4A or FIG. 4B is also similar to that of FIG. 1B. The main difference is as follows. In this embodiment, the head-up display device is designed as follows. The first image beam B1 is reflected four times by the polarization beam-splitting module 120C, but the second image beam B2 directly passes through the polarization beam-splitting module 120C.

In detail, in this embodiment, the polarization beam-splitting module 120C includes the first region R1 and the second region R2. The first region R1 is disposed between the display unit 110 and the second region R2. The polarization beam-splitting layer 121 is disposed between the first region R1 and the second region R2, and is configured to reflect the first image beam B1 having the first polarization direction and enable the second image beam B2 having the second polarization direction to pass through.

In this embodiment, a first reflection unit 122C and a second reflection unit 123C are respectively disposed beside the first region R1 and the second region R2, and the first reflection unit 122C and the second reflection unit 123C are respectively located at two opposite sides of the polarization beam-splitting module 120C. A first mirror 122-1' and a second mirror 123-1' are arranged to be parallel to each other. The first image beam B1 from the display unit 110 enters the first region R1, and is reflected by the polarization beam-splitting layer 121. After sequentially passing through a first quarter-wave plate 122-2', being reflected by the first mirror 122-1', passing through the first quarter-wave plate 122-2', passing through the polarization beam-splitting layer 121, entering the second region R2, passing through a second quarter-wave plate 123-2', being reflected by the second mirror 123-1', passing through the second quarter-wave plate 123-2', and being reflected by the polarization beam-splitting layer 121, the first image beam B1 then passes through the second region R2 to be transmitted to the optical module 130. The first image beam B1 having the first polarization direction sequentially passes through the first quarter-wave plate 122-2', is reflected by the first mirror 122-1', and passes through the first quarter-wave plate 122-2'. The first polarization direction of the first image beam B1 is converted into the second polarization direction after the first image beam B1 passes through the first quarter-wave plate 122-2' twice, and thus the first image beam B1 having the second polarization direction passes through the polarization beam-splitting layer 121. Then, the first image beam B1 having the second polarization direction sequentially passes through the second quarter-wave plate 123-2', is reflected by the second mirror 123-1', and passes through the second quarter-wave plate 123-2'. The second polarization direction of the first image beam B1 is converted into the first polarization direction after the first image beam B1 passes through the second quarter-wave plate 123-2' twice, and then the first image beam B1 having the first polarization direction is reflected by the polarization beam-splitting layer 121. As shown in FIG. 4B, after the second image beam B2 from the display unit 110 enters the first region R1, the second image beam B2 having the second polarization direction from the display unit 110 sequentially passes through the polarization beam-splitting layer 121 and the second region R2 to be transmitted to the optical module 130.

In addition, advantages of the head-up display device in the fourth embodiment of the disclosure are similar to those of the head-up display device 100 of FIG. 1A. Thus, details in this regard will not be further reiterated in the following.

Based on the above, in an embodiment of the disclosure, the head-up display device is designed to enable the display unit to generate the first image beam and the second image beam, and enable the optical path length of the first image beam from the display unit to the position of the first virtual image to be longer than the optical path length of the second image beam from the display unit to the position of the second virtual image through a design of the polarization beam splitting module. Therefore, the architecture of the overall head-up display device has the advantages such as smaller volume, lower power consumption, and lower cost.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A head-up display device, configured to project a first image beam and a second image beam onto a target element, and comprising a display unit, a polarization beam-splitting module, and an optical module, wherein the display unit is configured to provide the first image beam having a first polarization direction and the second image beam having a second polarization direction;

the polarization beam-splitting module receives the first image beam and the second image beam from the display unit, and transmits the first image beam and the second image beam to the optical module, wherein the polarization beam-splitting module comprises a polarization beam-splitting layer, a first reflection unit, and a second reflection unit, the polarization beam-splitting layer is configured to guide the second image beam to leave the polarization beam-splitting module and guide the first image beam to the first reflection unit and the second reflection unit, and the first reflection unit and the second reflection unit are not located on a transmission path of the second image beam; and the optical module comprises a free-form mirror configured to receive the first image beam and the second image beam from the polarization beam-splitting module, and the first image beam and the second image beam are respectively reflected by the optical module to an outside of the head-up display device, and then transmitted to the target element, so as to form a first virtual image and a second virtual image, wherein by the polarization beam-splitting module, an optical path length of the first image beam from the display unit to a position of the first virtual image formed by the first image beam is longer than an optical path length of the second image beam from the display unit to a position of the second virtual image formed by the second image beam, wherein the first reflection unit comprises a first mirror and a first quarter-wave plate, and the second reflection unit comprises a second mirror and a second quarter-wave plate, wherein the first quarter-wave plate is disposed between the first mirror and the polarization beam-splitting layer, and the second quarter-wave plate is disposed between the second mirror and the polarization beam-splitting layer.

2. The head-up display device according to claim 1, wherein the first polarization direction and the second polarization direction are perpendicular to each other.

3. The head-up display device according to claim 1, further comprising a sensor and a controller, wherein the sensor is configured to sense a position of an eye and generate a sensing signal; and the controller is electrically connected to the sensor and coupled to the optical module, and the controller receives the sensing signal from the sensor and adjusts a deflection angle of the free-form mirror corresponding to a change of the position of the eye, so that the first virtual image and the second virtual image are clearly presented.

4. The head-up display device according to claim 1, wherein the polarization beam-splitting module comprises:

a first region configured to enable the first image beam and the second image beam from the display unit to be incident and exited; and a second region adjacent to the first region, and configured to enable the first image beam to be incident and reflected a plurality of times before being exited to the first region, wherein the polarization beam-splitting layer is disposed between the first region and the second region, and is configured to enable the first image beam having the first polarization direction to pass through and reflect the second image beam having the second polarization direction.

5. The head-up display device according to claim 4, wherein the first reflection unit and the second reflection unit are disposed beside the second region, and the first mirror and the second mirror are perpendicular to each other;

the first image beam from the display unit sequentially passes through the first region and the polarization beam-splitting layer, and then enters the second region, the first image beam in the second region sequentially passes through the first quarter-wave plate, is reflected by the first mirror, passes through the first quarter-wave plate, is reflected by the polarization beam-splitting layer, passes through the second quarter-wave plate, is reflected by the second mirror, passes through the second quarter-wave plate, and passes through the polarization beam-splitting layer, and then the first image beam passes through the first region to be transmitted to the optical module;

after the second image beam from the display unit enters the first region, the second image beam from the display unit is reflected by the polarization beam-splitting layer to be transmitted to the optical module.

6. The head-up display device according to claim 4, wherein the display unit has a first effective imaging area and a second effective imaging area disposed adjacently to respectively generate the first image beam and the second image beam, and the first virtual image and the second virtual image formed outside the head-up display device present different image contents.

7. The head-up display device according to claim 6, wherein a range of an orthographic projection of the first mirror on the display unit and the second effective imaging area of the display unit do not overlap with each other.

8. The head-up display device according to claim 6, wherein the polarization beam-splitting module comprises a first transparent body disposed in the first region and a second transparent body disposed in the second region, the polarization beam-splitting layer is disposed on a surface of the second transparent body facing the first transparent body and located between the first transparent body and the second transparent body, and a contact area between the first transparent body and the polarization beam-splitting layer is less than a total area of the polarization beam-splitting layer.

9. The head-up display device according to claim 6, wherein a range of an orthographic projection of the first mirror on the display unit and the second effective imaging area of the display unit overlap with each other.

10. The head-up display device according to claim 6, wherein the polarization beam-splitting module comprises a first transparent body disposed in the first region and a second transparent body disposed in the second region, the polarization beam-splitting layer is disposed on a surface of the second transparent body facing the first transparent body or a surface of the first transparent body facing the second transparent body, and located between the first transparent body and the second transparent body, and a contact area between the first transparent body and the polarization beam-splitting layer is equal to a total area of the polarization beam-splitting layer.

11. The head-up display device according to claim 4, wherein the display unit comprises an effective imaging area configured to generate the first image beam and the second image beam at different time intervals, and the first virtual image and the second virtual image formed outside the head-up display device present different image contents.

12. The head-up display device according to claim 11, further comprising a polarization switching device, wherein the polarization switching device is disposed between the display unit and the polarization beam-splitting module, at a first time interval, the first image beam emitted from the display unit passes through the polarization switching device to have the first polarization direction, and at a second time interval, the second image beam emitted from the display unit passes through the polarization switching device to have the second polarization direction.

13. The head-up display device according to claim 11, wherein the polarization beam-splitting module comprises a first transparent body disposed in the first region and a second transparent body disposed in the second region, and a contact area between the first transparent body and the second transparent body is equal to an area of the polarization beam- splitting layer.

14. The head-up display device according to claim 1, wherein the polarization beam-splitting module comprises a first region and a second region, wherein the first region is disposed between the display unit and the second region, and the polarization beam-splitting layer is disposed between the first region and the second region, and is configured to reflect the first image beam having the first polarization direction and enable the second image beam having the second polarization direction to pass through.

15. The head-up display device according to claim 14, wherein the first reflection unit and the second reflection unit are respectively disposed beside the first region and the second region, and the first mirror and the second mirror are parallel to each other;

the first image beam from the display unit enters the first region and is reflected by the polarization beam-split-ting layer, the first image beam sequentially passes through the first quarter-wave plate, is reflected by the first mirror, passes through the first quarter-wave plate, passes through the polarization beam-splitting layer, enters the second region, passes through the second quarter-wave plate, is reflected by the second mirror, passes through the second quarter-wave plate, and is reflected by the polarization beam-splitting layer, and then the first image beam passes through the second region to be transmitted to the optical module;

after the second image beam from the display unit enters the first region, the second image beam from the display unit sequentially passes through the polariza-tion beam-splitting layer and the second region to be transmitted to the optical module.

* * * * *